Patented Jan. 10, 1933

1,893,798

UNITED STATES PATENT OFFICE

MORRIS G. FOWLER, CHARLES R. KUZELL AND OLIVER C. RALSTON, OF CLARKDALE, ARIZONA, ASSIGNORS TO UNITED VERDE COPPER COMPANY, OF CLARKDALE, ARIZONA, A CORPORATION OF DELAWARE

METALLURGY OF COMPLEX ORES

No Drawing.   Application filed January 14, 1929. Serial No. 332,557.

This invention relates to metallurgy and has for an object the provision of an improved process for treating complex ores. More particularly, the invention contemplates the provision of an improved process for recovering zinc from complex ores.

The process of the present invention involves the treatment of molten mineral baths containing one or more zinc compounds with oxidizing and/or reducing agents for the purpose of recovering zinc and other easily volatilizable elements contained therein. According to the process of the invention, a molten mineral bath may be subjected to an oxidizing treatment or a reducing treatment or an oxidizing treatment followed by a reducing treatment to effect the removal and recovery of zinc contained therein. The oxidizing treatment results in the production of a fume containing zinc oxide. The reducing operation results in the production and vaporization of metallic zinc which may be oxidized to produce zinc oxide. The zinc oxide produced may be recovered in any suitable manner.

Slags and mattes produced in smelting ores containing zinc sulphide may be subjected to suitable oxidizing and reducing treatments for the recovery of zinc contained therein. Thus, for example, the slag and matte may be subjected either separately or together to a reducing treatment for the purpose of producing and vaporizing metallic zinc, or the slag may be subjected to a reducing treatment and the matte may be subjected to an oxidizing treatment which may be followed by a reducing treatment of the entire bath or of slag produced during the course of the oxidizing treatment. When the matte is to be subjected to an oxidizing treatment the slag may be permitted to remain in contact therewith during the course of the oxidizing treatment. The oxidizing treatment may then be followed by a reducing treatment of the entire bath or of the slag alone.

According to a preferred process of the invention, an ore such, for example, as an ore containing sulphides of copper, zinc and iron is smelted to produce a molten bath of slag and matte. The resulting bath is blown with an oxidizing gas such as air to produce a fume containing zinc oxide which may be collected in any suitable manner. The blowing is preferably continued until the matte reaches the stage of white metal at which time substantially all of the zinc will have been eliminated therefrom. Nearly all of the remaining zinc will be present in the slag, and it may be recovered by subjecting the slag or the slag and white metal to the action of a reducing agent. Further recovery of zinc is preferably accomplished by separating the slag and white metal and subjecting the slag alone or in contact with freshly formed matte to the action of a reducing agent.

The process is usually conducted as a batch operation, and we prefer to employ tilting furnaces or vessels similar in type to copper converters, horizontal or vertical, equipped with tuyères for the injection of reducing and oxidizing agents; from which charges may be readily removed and into which new charges may be readily introduced.

Suitable reducing agents for use in carrying out the process of the invention are any that will reduce iron from its oxides and zinc from its oxide or sulphide and may be injected by means of tuyères through the molten bath containing these oxides and sulphides. Solid, liquid or gaseous reducing agents may be used but the choice depends on the efficiency of reduction and the cost of the reducing agent. The most suitable solid reducing agent is pulverized coal which may be injected through the bath by means of steam or compressed air, or mixture of the two. Finely powdered sponge iron could also be used but necessitates separate means of keeping the bath hot. Liquid reducing agents that may be used are the various hydrocarbon oils and they may be injected by themselves under pressure, or mixed with air or steam, or mixture of the two. The reducing gases suitable are carbon monoxide and hydrogen and hydrocarbon gas, though in practice the pure gases are not used due to their high cost, but natural gas, producer gas or water gas, the reducing power of which depends on their contents of hydrocarbons, carbon monoxide, and hydrogen are used. In producer gas made from air or from air and steam the reducing gas or gases are diluted by a considerable amount of nitrogen from the air, the actual amount depending on the relative proportions of air and steam used in the gas producer, and this dilution with nitrogen is of decided benefit, as will be explained later. This is also true of gases generated in the bath by injected liquid or solid fuels with air or air and steam.

This process as developed is intended primarily for two purposes, the first of which is the smelting of zinc or other volatile metal ores and concentrates directly in a tilting or stationary furnace equipped with suitable air or gas inlets under the molten bath to cause subsequent volatilization of the reducible volatile metals. This may be done, for example, in a regularly equipped copper converter by introducing the ore or concentrates into a bath of matte and blowing air through the bath with the addition of siliceous flux if required. The heat developed during oxidation of the matte is sufficient to smelt a considerable amount of ore or concentrates, but the smelting capacity is greatly increased by using oil or coal dust burners in the ends of the vessel to increase the heat available.

As an instance, we have determined by experiment in a standard copper converter that blowing a charge of copper zinc matte to 75-80% Cu, without the use of any reducing agent whatever, eliminates practically all the zinc from the metal bath through vaporization, but the slag is still high in zinc content. Thus we may simply smelt as large an amount of the ore or concentrates in the converter by its own heat of combustion as possible and only blow air through the bath sufficient to supply iron oxide to flux the gangue and then fume off the zinc by blowing in reducing agents through a separate set of tuyères, which have been idle during the oxidation and smelting period. Or we may blow the charge to 75-80% Cu, with vaporization of part of the zinc, skim off the slag, transfer it to another vessel which would be used only for reduction, and reduce the remaining zinc from the slag by itself or in contact with fresh matte which may be added. As an instance of this latter procedure, we have used a Great Falls type of copper converter into which a small ladle of copper matte was introduced and blown until it was hot. Thereafter complex copper-zinc-iron sulphide ore, containing 5% Cu, 7% Zn and 30% Fe, was fed continuously or in small batches with continuous blowing of the bath with air, sufficient heat being generated to smelt the ore, producing both matte and slag. Whenever the temperature of the converter bath exceded 2100° F. dense fumes of zinc oxide issued from the mouth of the converter, the zinc flame being noticeable by its color and sufficient air for the complete combustion of zinc vapor being available only after the gases issued from the mouth of the converter. In this manner 55% of the total zinc in the charge was eliminated without the use of any reducing agent before the matte reached the "white metal" stage (75-80% Cu). Nearly all the remaining zinc was in the slag and this slag required treatment by reducing agents in accordance with our above-described invention. We believe that the sequence of operations just described is unique in metallurgy.

The second purpose is to receive zinc-containing mattes and slags from a reverberatory or blast smelting furnace and reduce the zinc from them in contact or separately.

Following is one application of the process. Much work has been done in previous time by others on the desulphurization of zinc sulphide, ZnS, by metallics, and the direct volatilization of metallic zinc from the sulphide. The metallic most commonly used was iron, though some others would work as well—metallic copper for instance. We have found by experiment that the vapor pressure of zinc from a sulphide bath is quite low even with more than enough metallics added to decompose all the ZnS and at temperatures above the boiling point of metallic zinc. In order to drive off even the larger portion of the zinc from a molten sulphide bath, a large quantity of metallics and a relatively high temperature is necessary, making the process decidedly expensive. We have found by experiment that by blowing neutral or reducing gases through a zinc containing sulphide bath to which have been added metallics to desulphurize the zinc, the zinc is volatilized readily at a relatively lower temperature and with adddition to the bath of smaller quantity of metallics. The function of the neutral gas, such as nitrogen, is to simply sweep out the zinc or other metal vapor from the bath. Reducing gases as carbon monoxide, hydrogen, gaseous hydrocarbons or commercial gas such as are obtained in producer gas or water gas, or are generated in the bath itself by injecting solid or liquid fuels, act both to sweep out the zinc from the bath and also to reduce the zinc from its sulphide and reduce iron from both its sulphide and oxide, which gives more metallic iron to desulphurize the zinc.

Hydrogen has been shown to decompose sulphides liberating the metal:

$$ZnS + H_2 = Zn + H_2S$$
$$FeS + H_2 = Fe + H_2S$$
$$Fe + ZnS = Zn + FeS$$

The efficiency of reduction of the sulphide to metal is low in respect to hydrogen. Carbon monoxide has little or no action on the sulphides in the matte, but does reduce iron oxide (iron oxide is present in all mattes made in normal smelter operations) readily to metallic iron. The gases act both to sweep out the zinc and to reduce zinc and iron compounds. For this reason, the presence of nitrogen in the gas is an advantage and results in lower fuel cost.

In our process we may add some metallics to the molten sulphide bath and volatilize the zinc with less consumption of fuel for reduction, or we may depend entirely on the reducing action of the injected reducing agents to produce the necessary metallics.

The most useful and valuable application of our process is the reduction of matte and slag in contact with each other. We have found by experiment that the reduction by our process of zinc containing mattes to volatilize the zinc is more expensive, in respect to fuel for reduction, than similar treatment of slags, basic or acid, and that reduction of mattes and slags in contact is much less expensive than the reduction of either by itself. In technical mattes apparently all the zinc is present as sulphide which is not readily decomposed by the injected reducing agents, so in case of matte by itself, most of the decomposition of the zinc sulphide, liberating metallic zinc, has to take place by reduction of the iron oxide in the matte to metallic iron which desulphurizes the zinc.

In the case of reduction of zincy slags by themselves, the zinc is probably present both as sulphide and oxide. The zinc oxide is very readily reduced to metal which volatilizes easily as it apparently has less solubility in slag than in matte and consequently a higher vapor pressure. The zinc sulphide is decomposed by metallic iron produced by reduction of some of the iron oxide in the slag, liberating metallic zinc. However, in the reduction of the slag by itself to volatilize the zinc, serious difficulties may occur due to the thickening of the slag which we believe to be caused by the presence of metallic iron disseminated through the slag. In the case of basic slags, they become very mushy and it becomes practically impossible to inject reducing agents through them unless a very high temperature is used. In the case of acid slags, they tend to foam on reduction causing difficulty in handling and low efficiency in respect to the fuel used as reducing agent. The iron oxide in slags, uncombined with silica seems to be more readily reduced than the iron oxide in matte. In the matte, the oxide is possibly present as a compound or complex of ferrous oxide, $FeO$, and ferrous sulphide, $FeS$, which is not readily reduced.

When a bath of slag and matte in contact is reduced by injecting reducing agents through it, there is little or no tendency to thicken, provided, of course, the temperature is not permitted to drop, and the zinc is volatilized more readily than in the case of reduction of either by itself. The metallic iron, produced by reduction of iron oxide in the slag, dissolves in the matte which has a lower melting point than metallic iron, thus preventing thickening of the slag. This dissolved metallic iron desulphurizes the zinc sulphide in the matte and in the slag also and the zinc oxide is readily reduced by the iron and the injected reducing agents themselves. The matte and slag are being mixed up very thoroughly during the reduction, due to the agitation caused by the injection, and the zinc is volatilized very readily. The relative proportions of matte and slag may vary within wide limits.

Another feature of this application of the process is the increase in silicate degree of the slag due to reduction of some of the iron oxide from the slag, with resulting decrease in copper content. Some of the slags we have treated in this manner, in contact with matte, show decrease in copper content from 0.4% Cu to 0.13% Cu. With good settling facilities, the copper content of the slag after treatment may be kept as low as 0.1% Cu. Basic converter slags, which normally run 1.5% to 2.0% Cu, showed only 0.4% to 0.5% Cu after treatment.

The gases leaving the bath and carrying zinc vapor may be treated by any of the usual methods of recovering zinc fume, such as cooling and passing through dust chambers, Cottrell electrical precipitators, bag houses or scrubbing towers. The exact means of such recovery are not important to this invention.

We wish it understood that we have specified applications of our process merely as being typical and do not confine ourselves to these detailed descriptions as very many variations are possible and still come within the scope of the following claims. Also many different metallurgical products, produced in different ways may be treated by this process for the recovery of zinc or other volatile metals.

We claim:

1. The method of recovering zinc from ore containing copper and zinc minerals which comprises smelting the ore to form a molten bath of slag and matte, blowing the resulting bath until the matte has reached the stage of white metal, and subjecting the resulting bath to the action of a reducing agent to form and vaporize metallic zinc.

2. The method of recovering zinc from ore containing copper and zinc minerals which comprises smelting the ore to form a molten bath of slag and matte, blowing the resulting bath until the matte has reached the stage of white metal, injecting a reducing agent into the resulting bath to form and vaporize metallic zinc, and subjecting the zinc vapor to the action of an oxidizing agent.

3. The method of treating ore containing copper and zinc sulphides which comprises smelting the ore to form a molten bath of slag and matte, blowing air through the molten bath until the matte has reached the stage of white metal, and subsequently reducing one or more zinc compounds contained in the bath.

4. The method of treating ore containing copper and zinc sulphides which comprises smelting the ore to form a molten bath of slag and matte, blowing air through the molten bath until the matte has reached the stage of white metal, and subsequently reducing one or more zinc compounds contained in the bath by injecting a reducing agent.

5. The method of treating ore containing copper and zinc sulphides which comprises smelting the ore to form a molten bath of slag and matte, blowing the matte to white metal while maintaining a temperature above 2100° F., and subsequently reducing one or more zinc compounds contained in the bath.

6. The method of treating ore containing copper and zinc sulphides which comprises smelting the ore to form a molten bath containing matte, blowing the matte until it reaches the stage of white metal containing about 75 to 80 per cent copper, and subsequently reducing one or more zinc compounds contained in the bath.

7. The method of treating ore containing copper and zinc sulphides which comprises smelting the ore to form a bath containing matte, blowing the matte to recover a portion of the zinc contained therein, and subsequently subjecting the matte to the action of a reducing agent to recover additional zinc.

8. The method of treating ore containing sulphides of copper, zinc and iron which comprises charging the ore into a molten bath of matte, treating the resulting charge to form a molten bath of slag and matte, and subjecting the resulting bath to the action of a carbonaceous reducing agent to form and vaporize metallic zinc.

9. The method of treating ore containing sulphides of copper, zinc and iron which comprises charging the ore into a molten bath of matte, treating the resulting charge to recover a portion of the zinc and form a molten bath of slag and matte, and subsequently subjecting the bath to the action of a carbonaceous reducing agent to recover additional zinc.

10. The improvement in zinc metallurgy which comprises injecting a carbonaceous reducing agent into a molten bath of matte containing a zinc compound and iron oxide to reduce the zinc compound and form metallic zinc, vaporizing the metallic zinc, and recovering the vaporized zinc.

11. The improvement in zinc metallurgy which comprises injecting a solid carbonaceous reducing agent into a molten bath of matte containing a zinc compound and iron oxide to reduce the zinc compound and form metallic zinc, vaporizing the metallic zinc, and recovering the vaporized zinc.

12. The improvement in zinc metallurgy which comprises injecting a hydrocarbon into a molten bath of matte containing a zinc compound and iron oxide to reduce the zinc compound and form metallic zinc, vaporizing the metallic zinc, and recovering the vaporized zinc.

13. The improvement in zinc metallurgy which comprises injecting a gas containing hydrogen into a molten bath of matte containing a zinc compound and iron oxide to reduce the zinc compound and form metallic zinc, vaporizing the metallic zinc, and recovering the vaporized zinc.

14. The method of recovering zinc from ore containing zinc sulphide which comprises smelting the ore to form a molten bath, blowing an oxidizing gas through the molten bath to recover a portion of the zinc contained therein, and subsequently reducing one or more zinc compounds contained in the bath.

15. The method of treating ore containing zinc sulphide which comprises smelting the ore to form a bath containing slag and matte, blowing the bath with an oxidizing gas to recover a portion of the zinc contained therein, and subsequently subjecting the bath to the action of a reducing agent to recover additional zinc.

16. The method of treating ore containing zinc sulphide which comprises charging the ore into a molten bath of matte, treating the resulting charge to form a molten bath of slag and matte, and subjecting the resulting bath to the action of a reducing agent to form and vaporize metallic zinc.

17. The method of treating ore containing sulphides of copper, zinc and iron which comprises charging the ore into a molten bath of matte, treating the resulting charge to recover a portion of the zinc and form a molten bath of slag and matte, and subsequently subjecting the bath to the action of a reducing agent to recover additional zinc.

18. The method of treating ore containing sulphides of copper, zinc and iron which comprises smelting the ore to form a molten bath of slag and matte, blowing the bath with an oxidizing gas to recover a portion of the zinc contained therein, removing the slag from the bath, and subjecting the slag in the form of a molten bath to the action of a reducing agent to recover additional zinc.

19. The method of treating ore containing sulphides of copper, zinc and iron which comprises smelting the ore to form a molten bath of slag and matte, blowing the bath with an oxidizing gas until the matte reaches the stage of white metal to recover a portion of the zinc contained therein, separating the slag and white metal, and subjecting the slag in the form of a molten bath to the action of a reducing agent to recover additional zinc.

20. The method of treating ore containing sulphides of copper, zinc and iron which comprises charging the ore into a molten bath containing matte, treating the resulting charge to form a molten bath of slag and matte, blowing the bath with an oxidizing gas to recover a portion of the zinc contained therein, removing the slag from the bath, and subjecting the slag in the form of a molten bath to the action of a reducing agent to recover additional zinc.

21. The method of treating ore containing sulphides of copper, zinc and iron which comprises charging the ore into a molten bath containing matte, treating the resulting charge to form a molten bath of slag and matte, blowing the bath with an oxidizing gas until the matte reaches the stage of white metal to recover a portion of the zinc contained therein, separating the slag and white metal, and subjecting the slag in the form of a molten bath to the action of a reducing agent to recover additional zinc.

MORRIS G. FOWLER.
CHARLES R. KUZELL.
OLIVER C. RALSTON.